(No Model.)
A. F. FRIEND.
SKEWER PULLER.
No. 292,643. Patented Jan. 29, 1884.
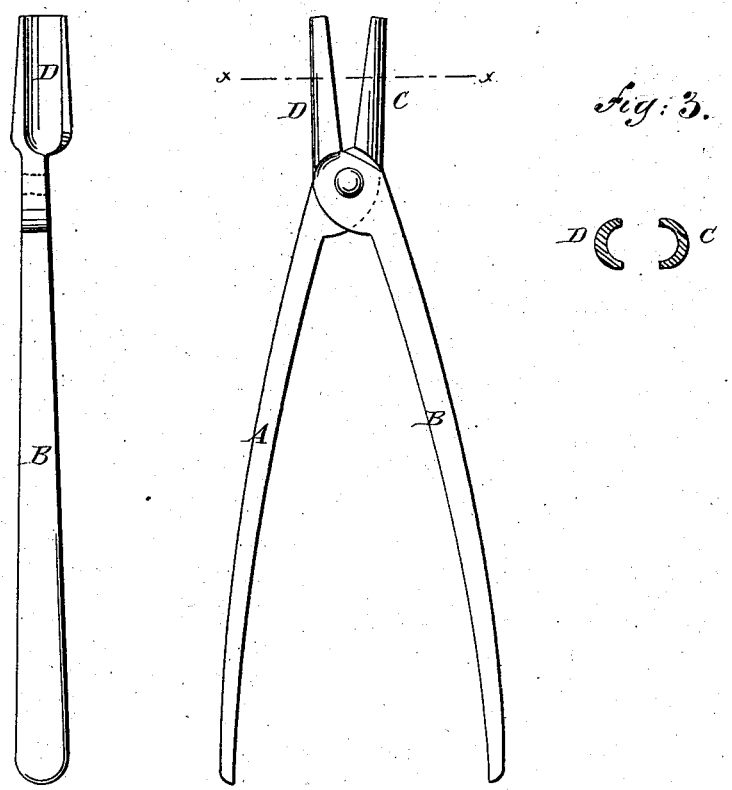
WITNESSES:
Chas. Nida
C. Sedgwick
INVENTOR:
A. F. Friend
BY Munn & Co
ATTORNEYS.

UNITED STATES PATENT OFFICE.

AUGUSTUS F. FRIEND, OF GRAVESEND, NEW YORK.

SKEWER-PULLER.

SPECIFICATION forming part of Letters Patent No. 292,643, dated January 29, 1884.

Application filed December 12, 1883. (No model.)

*To all whom it may concern:*

Be it known that I, AUGUSTUS F. FRIEND, of Gravesend, in the county of Kings and State of New York, have invented a new and useful Improvement in Skewer-Pullers, of which the following is a full, clear, and exact description.

Reference is to be had to the accompanying drawings, forming a part of this specification, in which similar letters of reference indicate corresponding parts in all the figures.

Figure 1 is a side elevation of my improvement. Fig. 2 is an elevation of one part of the same. Fig. 3 is a sectional plan view of the jaws, taken through the line $x$ $x$, Fig. 1.

The object of this invention is to facilitate the withdrawal of skewers from cooked meats.

The invention consists in a skewer-puller constructed with handles pivoted to each other at their forward ends, and provided at their said forward ends with jaws having their faces concaved longitudinally, as will be hereinafter fully described.

A B represent the handles of the improvement. The handles A B may be made plain, as shown in Figs. 1 and 2, or may have their outer ends bent, and are provided with loops to prevent the hand of the operator from slipping from the said handles when using the implement. The forward ends of the handles A B are pivoted to each other, and upon the forward ends of the said handles are formed jaws C D, the faces of which are concaved longitudinally, as shown in Figs. 2 and 3, to adapt them to take a firm hold upon the skewer. The concaved faces of the jaws C D may be made smooth, as shown in the drawings, or may be roughened, as may be desired. With this construction the skewers can be easily, quickly, and conveniently withdrawn from the meat.

Having thus described my invention, I claim as new and desire to secure by Letters Patent—

1. A skewer-puller constructed substantially as herein shown and described, and consisting of the handles A B, pivoted to each other at their forward ends, and provided at their said forward ends with jaws C D, having their faces concaved longitudinally, as set forth.

2. In a skewer-puller, the jaws C D, concaved longitudinally, substantially as herein shown and described, to adapt them to take a firm hold upon a skewer, as set forth.

AUGUSTUS F. FRIEND.

Witnesses:
JAMES T. GRAHAM,
EDGAR TATE.